US010631691B2

(12) United States Patent
Becker et al.

(10) Patent No.: US 10,631,691 B2
(45) Date of Patent: Apr. 28, 2020

(54) METHOD AND SYSTEM FOR DETERMINING USAGE AND AUTHENTICATION OF A PAPER PRODUCT IN A DISPENSER

(71) Applicant: Kimberly-Clark Worldwide, Inc., Neenah, WI (US)

(72) Inventors: Stephen Becker, Cumming, GA (US); Charlene Dunbar, Lilburn, GA (US); Jason Kirkland, Cumming, GA (US); Warren Moede, Atlanta, GA (US); Tom Schulz, Roswell, GA (US); Chrissy Sheehan, Media, PA (US); Peter W. Shipp, Jr., Woodstock, GA (US); Matt Zielinski, Darien, CT (US); Paul F. Tramontina, Harleysville, PA (US)

(73) Assignee: Kimberly-Clark Worldside, Inc., Neenah, WI (US)

( * ) Notice: Subject to any disclaimer, the term of this patent is extended or adjusted under 35 U.S.C. 154(b) by 354 days.

(21) Appl. No.: 15/544,561

(22) PCT Filed: Jan. 30, 2015

(86) PCT No.: PCT/US2015/013868
§ 371 (c)(1),
(2) Date: Jul. 19, 2017

(87) PCT Pub. No.: WO2016/122624
PCT Pub. Date: Aug. 4, 2016

(65) Prior Publication Data
US 2018/0008104 A1 Jan. 11, 2018

(51) Int. Cl.
*A47K 10/36* (2006.01)
*A47K 10/42* (2006.01)
(Continued)

(52) U.S. Cl.
CPC .............. *A47K 10/36* (2013.01); *A47K 10/32* (2013.01); *A47K 10/424* (2013.01);
(Continued)

(58) Field of Classification Search
CPC .................. A47K 10/36; A47K 10/424; A47K 2010/3226; A47K 10/32; A47K 10/3612;
(Continued)

(56) References Cited

U.S. PATENT DOCUMENTS

| 4,475,163 | A | * | 10/1984 | Chandler | ............... B66D 1/505 377/17 |
| 5,428,557 | A | * | 6/1995 | Harbaugh | ............. G06M 1/101 377/28 |

(Continued)

FOREIGN PATENT DOCUMENTS

| JP | H 07-088550 A | 4/1995 |
| JP | 2009-247608 A | 10/2009 |
| WO | WO 2013/056744 A1 | 4/2013 |

OTHER PUBLICATIONS

EP Supplementary Search Report, dated Sep. 18, 2018.
PCT Search Report, dated Sep. 30, 2015.

*Primary Examiner* — William A. Rivera
(74) *Attorney, Agent, or Firm* — Dority & Manning, P.A.

(57) ABSTRACT

A system and control method for determining an amount of paper product dispensed from a dispenser or remaining in the dispenser is provided. The paper product is initially loaded in the dispenser as a paper product formation, such as a roll or stack of the product. At defined intervals, a digital image of an aspect of the paper product formation in the dispenser is taken and transmitted to a digital imager processor. A feature of the digital image that changes as the paper product formation decreases in size as the paper product is dispensed is analyzed and compared with a predetermined value of the feature at a predefined size of the (Continued)

paper product formation to determine an amount of the paper product dispensed or remaining in the dispenser.

10 Claims, 9 Drawing Sheets

(51) Int. Cl.
| | | |
|---|---|---|
| *G06T 7/62* | (2017.01) | |
| *B65H 26/06* | (2006.01) | |
| *B65H 16/00* | (2006.01) | |
| *A47K 10/32* | (2006.01) | |
| *G06T 7/90* | (2017.01) | |
| *G06K 9/46* | (2006.01) | |

(52) U.S. Cl.
CPC ........... *B65H 16/005* (2013.01); *B65H 26/06* (2013.01); *B65H 26/066* (2013.01); *G06T 7/62* (2017.01); *A47K 10/3612* (2013.01); *A47K 2010/3226* (2013.01); *B65H 2404/143* (2013.01); *B65H 2511/142* (2013.01); *B65H 2511/152* (2013.01); *B65H 2511/512* (2013.01); *B65H 2553/42* (2013.01); *B65H 2557/11* (2013.01); *B65H 2557/23* (2013.01); *B65H 2701/1924* (2013.01); *G06K 9/4609* (2013.01); *G06K 9/4652* (2013.01); *G06K 2209/25* (2013.01); *G06T 7/90* (2017.01); *G06T 2207/30124* (2013.01)

(58) Field of Classification Search
CPC ........... B65H 26/066; B65H 2511/152; B65H 2404/143; B65H 2511/142; B65H 2553/42; B65H 2557/11; B65H 2701/1924; B65H 2511/512; B65H 2557/23; B65H 26/06; B65H 16/005; B65H 26/08; G06T 7/62; G06T 7/90; G06T 9/4609; G06T 2207/30124; G06K 9/4609; G06K 9/4652; G06K 2209/25

See application file for complete search history.

(56) References Cited

U.S. PATENT DOCUMENTS

| | | | |
|---|---|---|---|
| 7,780,380 B2 | 8/2010 | Nagaya et al. | |
| 8,982,337 B2* | 3/2015 | Miller | G01B 11/00 356/72 |
| 9,114,949 B2* | 8/2015 | Verdugo | B41J 29/48 |
| 9,944,481 B2* | 4/2018 | Green | B65H 43/02 |
| 10,018,462 B2* | 7/2018 | Miller | G01B 11/06 |
| 2006/0044381 A1* | 3/2006 | Osakama | B41J 3/4075 347/104 |
| 2009/0256304 A1 | 10/2009 | Koizumi et al. | |
| 2010/0289209 A1 | 11/2010 | Clark et al. | |
| 2012/0055272 A1* | 3/2012 | Sanada | B41J 15/042 73/865.8 |
| 2013/0050681 A1* | 2/2013 | Miller | G01B 11/00 356/72 |
| 2014/0367401 A1* | 12/2014 | Stralin | A47K 10/22 221/6 |
| 2014/0367508 A1 | 12/2014 | Verdugo et al. | |
| 2017/0369262 A1* | 12/2017 | Green | B65H 26/066 |

* cited by examiner

METHOD AND SYSTEM FOR DETERMINING USAGE AND AUTHENTICATION OF A PAPER PRODUCT IN A DISPENSER

FIELD OF THE INVENTION

The present invention relates generally to methods and systems for dispensing consumable paper products, such as rolled or stacked towels, from a dispenser wherein the amount of product remaining in the dispenser is determined without opening the dispenser.

BACKGROUND

Whether for private home use or public use, the dispensing of paper products such as towels and tissues has resulted in many different types of manual and automatic dispensing devices for controlling quantities dispensed, as well as for determining how much of the paper product has been dispensed. For example, U.S. Pat. No. 7,780,380 describes a dispenser of stacked paper products (e.g., folded and stacked napkins or paper towels) wherein a sensor unit is carried by an inner side wall of the dispenser housing and is used for detecting when refill of the dispenser is needed. The sensor unit uses an infrared sensor to detect when a stack of the paper product falls below a low paper point. A narrow beam of infrared light is sent from an emitter and is picked up by an adjacent detector. When the top of the paper stack lies above the infrared sensor, the detector does not pick up infrared light. However, when the top of the paper stack falls below the infrared sensor, light from the emitter is visible to the detector and an appropriate low paper warning is generated.

The U.S. '380 patent also describes an automatic roll product dispenser that detects the presence of a user and automatically dispenses a measured sheet of paper product. A mechanical lever is arranged on a pivot at one end and rests on the roll at the other end. A micro-switch or variable resistor located near the pivot detects changes in the pivoted position of the lever as the roll diameter decreases and generates a corresponding signal to a sensor unit that generates an indication of the amount of paper product remaining in the dispenser.

Other types of detection mechanisms are also suggested in the U.S. '380 patent, including purely electrical systems, purely mechanical systems, electro-mechanical systems, capacitive systems, and ultrasonic systems. Capacitive proximity sensors produce an electrostatic field that can sense paper and other non-metallic objects as well as metallic objects. Ultrasonic proximity sensors use a transducer to send and receive high frequency sound signals. The reflected sound has a shorter path when the paper is in proximity to the sensor.

Thus, the industry is continuously seeking new and improved dispensing systems that can accurately determine usage of the product without prohibitively adding to the cost of the dispenser or adversely affecting the product dispensing operation. It would be a significant benefit if the usage determination system could also serve as verification means to ensure that only authorized products are dispensed from the dispenser.

SUMMARY OF THE INVENTION

Objects and advantages of the invention will be set forth in part in the following description, or may be obvious from the description, or may be learned through practice of the invention.

In accordance with aspects of the invention, a dispenser system and method are provided for determining an amount of paper product dispensed from a dispenser or remaining in the dispenser, wherein the paper product is initially loaded in the dispenser as a paper product formation, such as a roll of a continuous tissue or paper towels, or a stack of folded napkins. It should be understood that the present system and method are not limited to a particular type or configuration of dispenser, or type of paper product dispensed. The inventive systems and methods are, however, particularly useful when integrated with consumable paper product dispensers (e.g., manual or automatic toilet tissue dispensers, paper towel dispensers, and folded napkin dispensers) typically found in an "away-from-home" public or semi-private environment. As used herein, the term "away-from-home" means a place or location where people congregate for various reasons or purposes that are outside the typical home. Examples of away-from-home locations include places of business, such as office buildings, office suites, retail stores, and warehouses, manufacturing facilities; schools; hospitals and other types of medical facilities; places of worship; hotels and motels; conference centers; and the like. The system is particularly useful in structures wherein multiple washroom facilities are provided for use of the building tenants or an industrial or manufacturing site wherein multiple site facilities are provided for a controlled populace. It should be appreciated though that the present washroom system may prove useful in a residential or private environment, and such uses are within the scope and spirit of the invention.

The method includes, at defined intervals, taking a digital image of an aspect of the paper product formation in the dispenser, and transmitting this digital image to a digital imager processor. For example, the image may be taken by a digital imager configured within the dispenser housing. The imager may be hard-wired to a digital image processor that is dedicated to the dispenser and located in or near the dispenser. Alternatively, the imager may be in wireless communication with a remote processor that is common to a plurality of different dispensers. The remote processor may be located at a monitoring station for a "smart washroom" within a commercial building, such as an office building, wherein the dispensers at the functional locations (e.g., sinks, toilets, changing closets, etc.) are remotely monitored as to availability or operational status.

Using the digital image processor, a feature of the digital image is analyzed that changes as the paper product formation decreases in size with depletion of the paper product. The digital image process compares the analyzed feature with a predetermined value of the feature at a predefined size of the paper product formation, which allows the processor (including associated hardware and software) to determine an amount of the paper product that has been dispensed or remains in the dispenser.

In one embodiment, the analyzed feature of the digital image is a dimension (e.g., length, height, radius, etc.) or count of pixels in the digital image of the feature that changes as the paper product formation decreases in size, wherein a decreasing dimension or pixel count is a measure of the amount of product dispensed. For example, a digital image may be taken of a side of the paper product formation, and the dimension or pixel count is determined by the digital processor to define the feature on the side that changes as the paper product formation decreases in size. In one embodiment, this feature may be the surface area of a portion or total side of the paper product formation. If modifications are not done to the side of the paper product formation, the color of the paper product needs to sufficiently contrast with a background color in the digital image to produce readily definable pixels above a threshold value that are detectable by the digital image processor for determining the dimension or pixel count corresponding to analyzed portion of the surface area. In this regard, interior components of the dispenser may be modified to produce a contrasting background color. For example, the components behind the paper product formation (along the axis of the digital imager) may be painted or otherwise darkened. Alternatively, the side of the paper product formation may be modified to present a darker or lighter contrasting color as compared to the background within the dispenser.

In a certain embodiment, a mark is formed on the side of the paper product formation, for example in a printing, stamping, spraying, or other process. The mark has a color that contrasts with the paper product and a pattern or design that decreases in size as the paper product is dispensed. The pixel count corresponds to pixels defining the mark on the side of the paper product formation in the digital image, or the analyzed dimension corresponds to the length or height of the mark, and the digital image processor compares the dimension or pixel count of the mark with a known dimensional value or total count of the pixels corresponding to the mark at a predefined size of the paper product formation. With this information, a processor can readily determine the amount of paper product that has been dispensed or remains in the dispenser. Desirably, the mark has a darker color than the paper product formation sufficient to produce readily definable darker pixels above a threshold value that are readily detected by the digital image processor as compared to lighter pixels corresponding to the paper product.

With the embodiment wherein a mark is provided on the paper product formation, such formation may be a stack of folded paper products, such as folded napkins, with the mark extending from a lower bottom portion of the stack towards an upper edge of the stack. For example, the mark may be a dark colored stripe applied to the side of the stack.

Alternatively, the paper product formation may be a roll of continuous paper product, with the mark extending radially from a center portion of the side towards a circumferential edge of the roll. The mark may extend along a radius line or along a complete diameter line on the side of the roll.

With still another embodiment, the analyzed mark may be a design or image that indicates origin of the paper product formation. For example the mark may be a proprietary image or logo, such as a graphic trademark image, indicating the manufacture or supplier of the paper product formation or dispenser. The digital image can be further analyzed by the processor to determine if the mark is present and valid before dispensing the paper product. For example, to ensure quality of the paper products as well as proper operation of automatic dispensers, it is desired that the rolls or stacks of paper products are from an authorized source. The dispenser may include a lock-out feature that prevents dispensing of the paper product unless an authorized paper product formation is loaded in the dispenser and detected. The digital image processor may be interfaced with the lock-out feature and determines whether the paper product formation is authentic and authorized based on presence of a valid detected mark in the digital image.

In still another embodiment, the feature that changes as the paper product formation decreases in size is a dimension of the side of the paper product formation. The digital image processor determines a value for the dimension from the digital image and compares the determined value to a known value of the dimension at predefined size of the paper product formation. With this information, an amount of the paper product dispensed or remaining in the dispenser is readily determined. For example, the paper product formation may be a stack of folded paper products, wherein the dimension corresponds to a height of the stack as the stack is dispensed. Alternatively, the paper product formation may be a roll of continuous paper product, wherein the dimension corresponds to a radius, circumference, or diameter of the roll as the roll is dispensed.

DETAILED DESCRIPTION OF THE INVENTION

Figure 1:
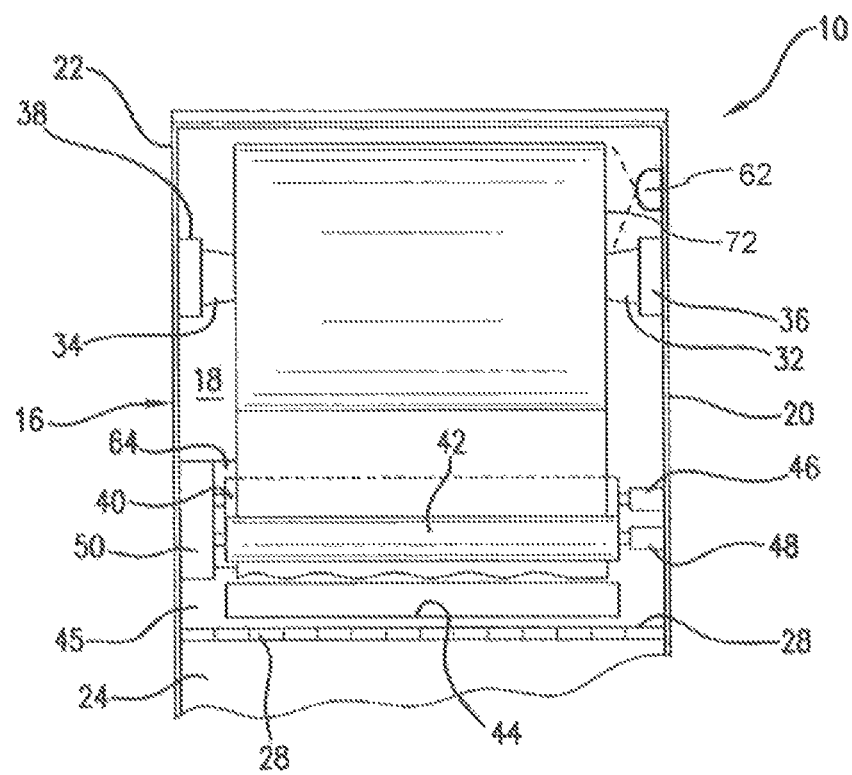
FIG. 1 is a front cut-away view of a roll product dispenser incorporating a digital imager in accordance with system and method aspects of the present invention.

Reference will now be made in detail to one or more embodiments of the invention, examples of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

Figure 2:
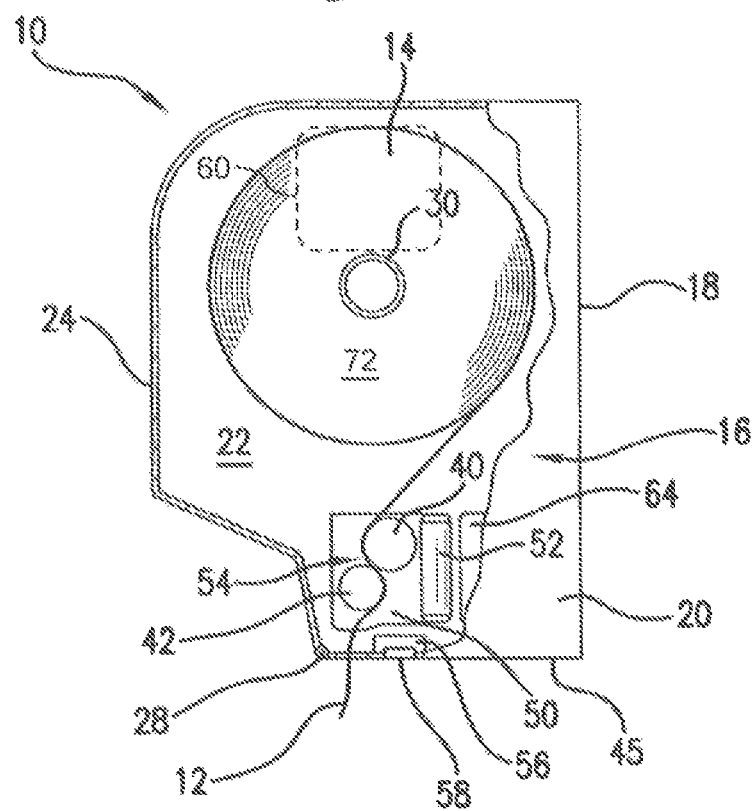
FIG. 2 is a side cut-away view of the dispenser of FIG. 1 and indicates the field of a digital image obtained by the digital imager.

Various embodiments of a dispensing system and method are depicted in the figures. With reference to FIGS. 1 and 2, an automatic electronic dispenser system 10 is illustrated for dispensing a paper product in the form of sheet material 12 from a paper product formation 14 loaded into the dispenser, such as a continuous roll of the sheet material. The paper product 12 in this embodiment is an absorbent material, such as paper toweling or toilet tissue, and so forth, which may be perforated for separation. The dispenser system 10 includes a dispenser housing 16 having a back panel 18 mountable to a wall or similar vertical surface, a pair of opposed side panels 20 and 22, and a front cover 24. The front cover 24 may be pivotally connected to a lower portion of the housing 16 with hinges 28 so as to be movable between a closed condition and an open condition. The front cover 24 of the dispenser housing 16 typically is opened for servicing or for loading a replacement sheet material roll 14 into the dispenser 10. A latch (not shown) allows the front cover 24 to be locked in the closed condition so as to avoid unauthorized tampering with the dispenser components within the housing 16.

The roll product formation ("roll") 14 may include a core or sleeve 30, or may be a coreless roll, such as that disclosed in U.S. Pat. No. 5,620,148. The roll 14 may be rotatably supported within the housing 16 by a pair of mounting hubs 32 and 34 which, in the illustrated embodiment are connected to the side panels 20 and 22 of the housing 16 by means of roll holders 36 and 38. The outer circumference of the sheet roll 14 may be supported by a portion of the housing without other support for unwinding of the roll 14, as disclosed for example in U.S. Pat. No. 6,224,010. It will be appreciated, however, that the housing 16 may be provided as a separate unit with few or no mechanisms connected thereto. In this instance, some or all of the dispensing mechanisms shown and/or described herein may be provided as one or more modules which are inserted into the housing. Examples of such dispenser housings and modules are disclosed in U.S. Pat. Nos. 4,131,044 and 6,079,035.

As depicted in FIGS. 1 and 2, the sheet material 12 runs off the roll 14, between a pair of rollers 40 and 42, and through a dispensing opening 44, for example, in a lower end 45 of the housing 16. Alternatively, the dispensing opening may be formed in the front cover, or in both a portion of the front cover and a portion of the lower end (not shown). The opening 44 may have a serrated edge, or it may carry teeth for severing the web of sheet material (if the material 12 is not perforated). One end of the roller 40 may be rotatably mounted to the side panel 20 of the housing 16 by means of a roll holder 46, and one end of the roller 42 may be rotatably mounted to the side panel 20 of the housing 16 by means of a roll holder 48. The other ends of the rollers 40 and 42 may be rotatably mounted to the side panel 22 by means of roll holders concealed within a transmission housing 50. The transmission housing 50 contains a transmission for transmitting drive from an electric motor 52 to the roller 40 so as to rotationally drive the roller.

The rollers 40 and 42 together define a nip 54 having a gap which is desirably slightly smaller than the thickness of the sheet material 12 on the roll 14. The sheet material 12 passes through the nip 54 so that rotation of the drive roller 40 and the driven roller 42 pulls the sheet material off of the roll 14 and dispenses it through the dispensing opening 44.

An activation sensor 56 may be mounted to the lower end 45 of the housing 16 (or, alternatively, to a module in the housing) adjacent a lens 58, as illustrated in FIG. 1. It will be understood, however, that the activation sensor 56 and/or lens 58, or any activations system known in the art, may be mounted in any area of the housing 16. The sensor 56 may be a conventional passive sensor for detecting infrared radiation. Passive infrared detectors are known in the art, and are described, for example, in U.S. Pat. No. 4,757,337. In practice, the sensor 56 is arranged to detect infrared radiation from a user's hand placed below the lens 58, and upon detecting the radiation, to transmit a signal for activating the electric motor 52 so as to dispense a length of sheet material through the dispensing opening 44.

In alternate embodiments, the sensor 56 may be an active device that emits an active signal to detect the presence of a user at or near the dispenser. Such active sensing systems are also well known to those skilled in the art.

Figure 6A:
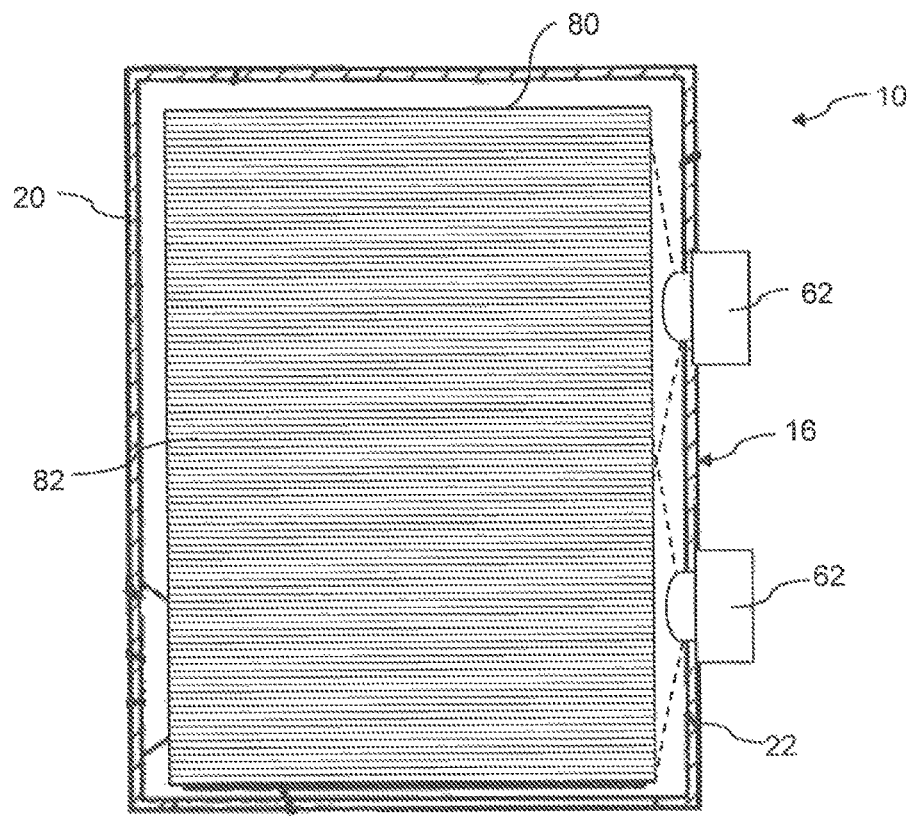
FIGS. 6a and 6b are a front cut-away and a side cut-away view of a stacked product dispenser incorporating a digital imager and indicating the field of a digital image obtained by the digital imager.
Figure 6B:
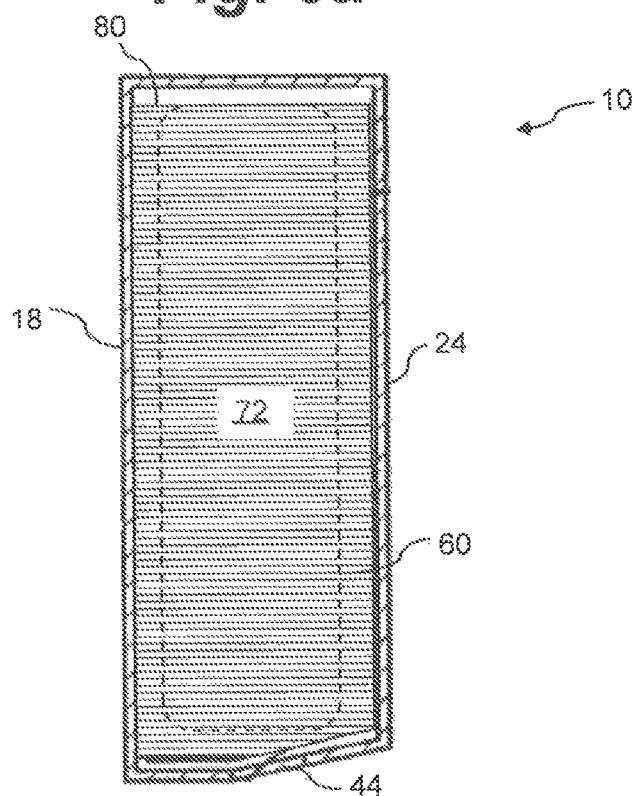

Aspects of the present system and method embodiments utilize digital imagining and processing techniques that are known to those skilled in the art of digital imagery. Referring generally to FIGS. 1, 2, 6a, and 6b, and discussed in greater detail below, one or more digital imagers 62 are utilized with a dispenser system 10 to generate a digital image 60 (e.g., FIGS. 3a and 3b) of an aspect of a paper product formation, such as the roll 14 or a stacked product 80, in a dispenser 16. The digital imager 62 may be any suitable and commercially available digital camera having a sufficient pixel density and resolution for the purposes described herein. The digital imager 62 may be mounted and oriented within the dispenser housing at a location to periodically generate the digital image 60 of an aspect of the paper product formation 14, 80, such as the side aspect 72. FIGS. 2 and 6b show in dashed lines the field of the digital image taken by the imagers 62 relative to the side 72 of the paper product formations 14, 80. The digital imagers 62 may be mounted completely within the dispenser housing 16, or may be mounted to the outside of the housing 16 with a lens that protrudes through a side wall 20, 22 of the housing, as depicted in the embodiment of FIG. 6a.

The digital images taken by the imagers 62 are transmitted to a digital image processor 64, which may be incorporated directly as a component of the dispenser system 10 or remotely located and common to a plurality of dispensers 16. The digital image processor 64 is configured with sufficient processing capability to analyze and differentiate pixels that define an edge or other changing aspect of the paper product formation captured in the digital image 60, such as the outer circumferential edge of the roll product formation 14 or top edge of the stacked paper product formation 80. In some embodiments as described herein, the digital image processor may conduct a count of pixels corresponding to the surface area of the paper product formation 14, 80 captured in the digital image 60, or a count of pixels corresponding to a mark or logo applied to the captured aspect of the paper product formation 14, 80, for example a dark colored stripe applied to the side 72 of the paper product formation 14, 80 that contrasts with the lighter colored paper product. The digital imager processor 64 may also determine a dimensional value of a feature captured in the digital image 60 that changes as the paper product is depleted, such as the radius of the roll product 14 (which includes a line extending in the radial direction), length of a logo or mark applied to the paper product formation 14, 80, height of a stacked paper product formation 80, and so forth. For example, by differentiating the pixels in the image 60 that define the outer (changing) limit of the dimensional feature, the processor 64 can measure and apply a value to a line drawn from a fixed point in the image to the changing limit. This value can then be compared to known values corresponding to a full paper product formation 14, 80, such as values that define stages of depletion of the products 14, 80, to calculate the amount of paper product that has been depleted or the amount that remains in the paper product formation 14, 80. This calculation may be an approximation based on known values, and interpolation between two known values, or an exact calculation based on the measured value of the dimension.

Thus, embodiments may rely on known edge detection techniques in digital image processing, which are mathematical methods that identify points in the image at which brightness changes relatively sharply (e.g., brightness discontinuities). The result of applying an edge detector technique to an image leads to a set of connected curves that indicate boundaries of objects in the image. Applying an edge detection algorithm to an image may significantly reduce the amount of data to be processed and filter out information that is less relevant, while preserving important structural properties of an image. The edges extracted from a two-dimensional image of a three-dimensional object can be classified as either viewpoint dependent or viewpoint independent. Relevant to the present disclosure, a viewpoint independent edge typically reflects inherent properties of the three-dimensional object, such as surface markings and surface shape. A typical edge might be the border between a block of red color against a yellow or white background.

There are many methods for edge detection, but most are grouped into two categories, search-based and zero-crossing based. The search-based methods detect edges by first computing a measure of edge strength, usually a first-order derivative expression such as the gradient magnitude, and then searching for local directional maxima of the gradient magnitude using a computed estimate of the local orientation of the edge, usually the gradient direction. The zero-crossing based methods search for zero crossings in a second-order derivative expression computed from the image in order to find edges, usually the zero-crossings of the Laplacian or the zero-crossings of a non-linear differential expression.

As a pre-processing step to edge detection, a smoothing stage, typically Gaussian smoothing, is almost always applied. Known edge detection methods mainly differ in the types of smoothing filters that are applied and the way the measures of edge strength are computed. As many edge detection methods rely on the computation of image gradients, they also differ in the types of filters used for computing gradient estimates in the x- and y-directions.

It should be appreciated that those skilled in the art of digital image processing are well versed in techniques that may be implemented for purposes of the present invention.

Figure 3A:
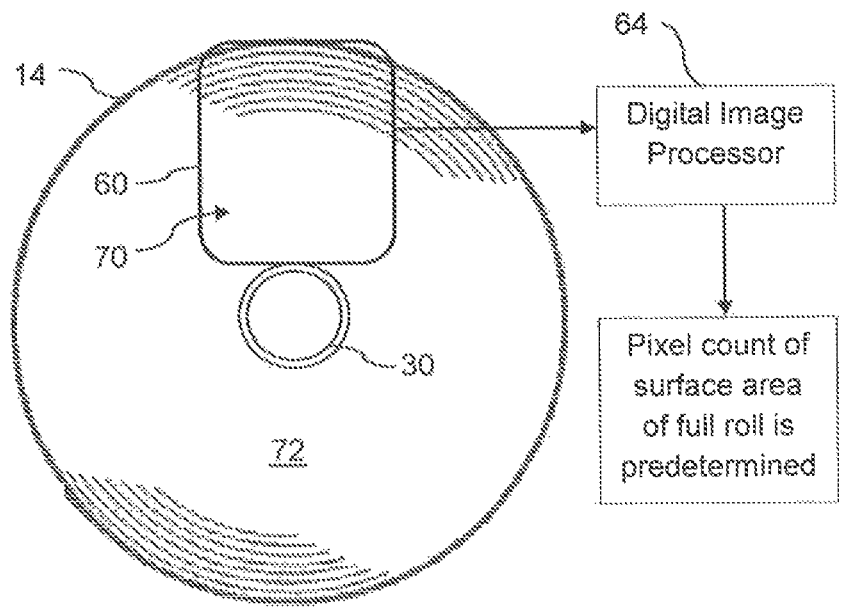
FIGS. 3a and 3b are side views of a roll product indicating a digital image taken of a full roll and a partially depleted roll, wherein the analyzed feature is surface area of the roll in the digital image.
Figure 3B:
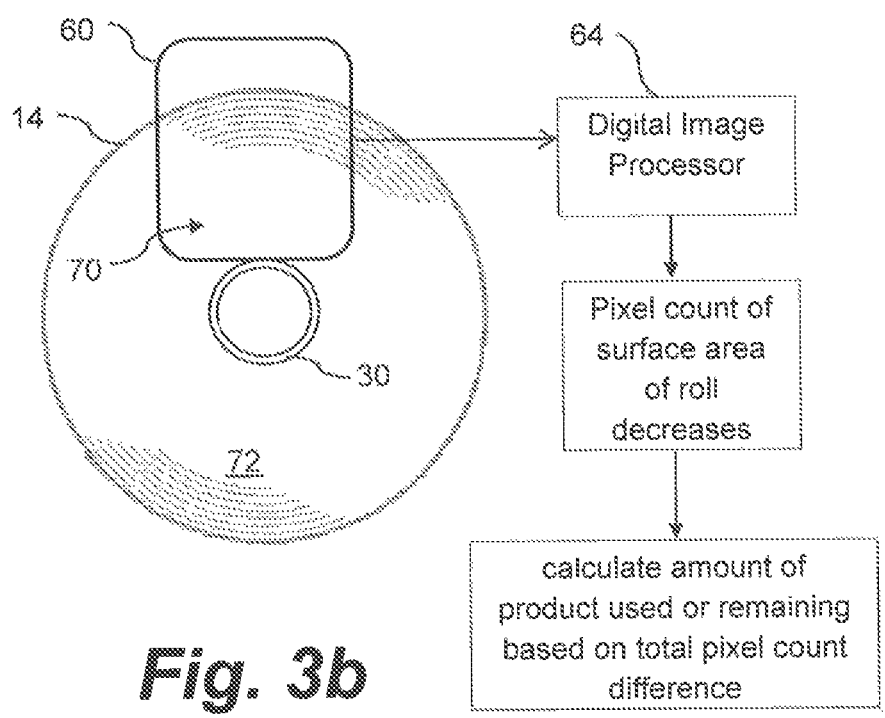

FIGS. 3A and 3B related to a method and system embodiment relevant to the roll product dispensing system 10 depicted in FIGS. 1 and 2. FIG. 3A illustrates the side 72 of the roll paper formation 14. The digital imager 62 in FIG. 1 is disposed above the roll hub 32 and roll holder 36 so as to capture the digital image 60 depicted in FIG. 3A. The digital image 60 essentially captures a surface area 70 of the roll product formation 14 at a full condition of the product 14. In this particular embodiment, the analyzed feature of the product formation 14 that changes as the paper product is depleted is the amount of surface area within the digital image 60.

Still referring to FIG. 3A, the digital image 60 may be transmitted to the digital image processor 64 via a wired or wireless connection depending on the location of the digital image processor. In this regard, the digital imager 62 includes sufficient hardware/software to carry out transmission of the image to the digital signal processor 64 in the event that the processor 64 is not incorporated as a component of the digital imager 62. An initial pixel count is conducted by the processor 64 of the surface area 70 captured in the image 60 that corresponds to the full roll. This may be done in a calibration step, with the results stored in the processor 64. Thus, this pixel count of the surface area 70 within the image 60 for a full roll product 14 is predetermined and stored in the digital image processor 64.

FIG. 3B illustrates the roll product formation 14 in a partially depleted state. It can be appreciated that the size (field) of the digital image 60 remains the same and the amount of surface area 70 within the digital image 60 has correspondingly decreased. The digital image 60 is transmitted to the image processor 64, wherein a pixel count of the surface area 70 remaining in the image 60 is conducted. By knowing the reduction in surface area within the digital image 60 and the pixel count of a full roll 14 from the steps depicted in FIG. 3a, a calculation can be readily made to determine the amount of paper product that has been used, or correspondingly the amount of paper product remaining on the roll product formation 14. It should be appreciated that these calculations may be predetermined and stored so that the processor 64 need only to compare a pixel count from the image depicted in FIG. 3B to one of the stored values to calculate the amount of product that has been used. For example, the pixel count from the image 60 in FIG. 3B may fall within a certain predefined range, wherein this range indicates that about 30 percent of the product has been depleted.

Still referring to FIGS. 3A and 3B, it can be appreciated that a sufficient color difference must exist between the paper product and the background in the digital image 60 in order to differentiate the surface area pixels from the background pixels. In this regard, the side 72 of the roll product formation may be enhanced for this purpose. For example, the entire side aspect 72 may be painted, sprayed, or otherwise applied with a darker pigment or color as compared to the background portions of the dispenser. Alternatively, the components within the dispenser 16 that lie in the image access of the imager 62 may be rendered darker or lighter as compared to the side 72 of the roll product formation 14 in order that a sufficient pixel value differentiation exists.

Figure 4A:
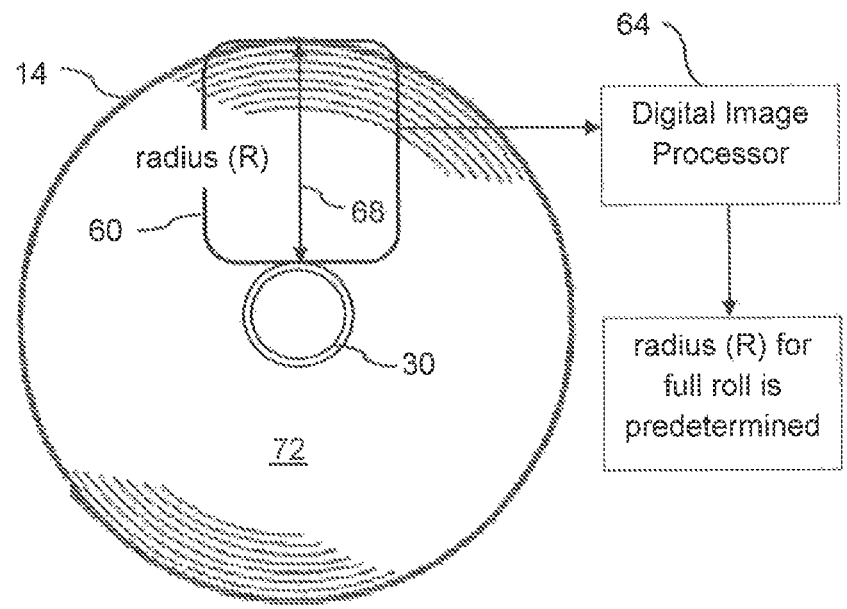
FIGS. 4a and 4b are side views of a roll product indicating a digital image taken of a full roll and a partially depleted roll, wherein the analyzed feature is the radius dimension of the roll in the digital image.
Figure 4B:
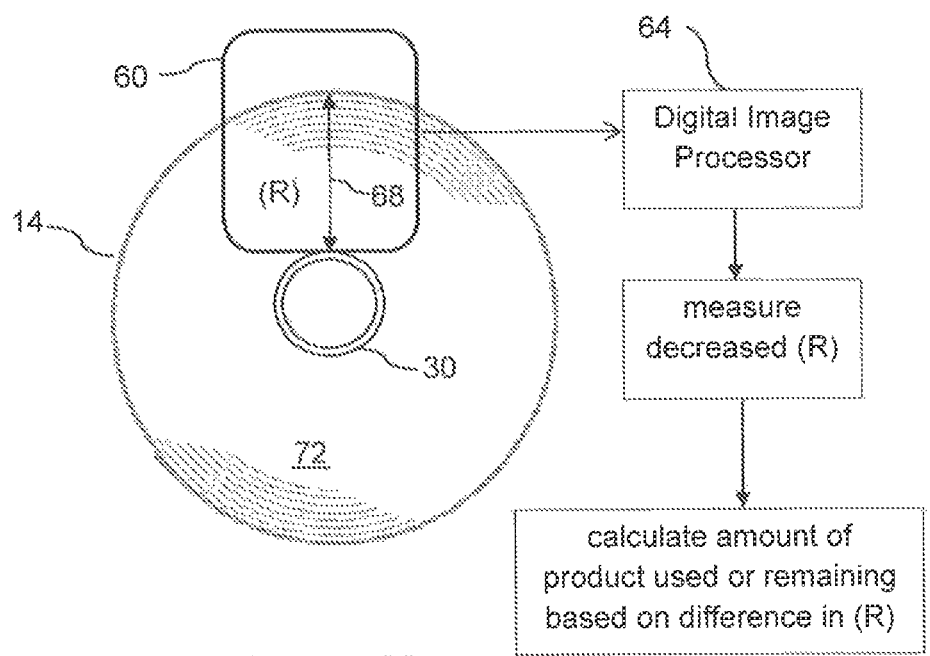

FIGS. 4A and 4B depict an embodiment wherein the analyzed feature that changes as the paper product formation 14 decreases in size is the radius dimension of the roll product formation 14. FIG. 4A depicts an initial full roll product formation 14 with a maximum radius along radial line 68. As depicted in FIG. 4A, the value of the radial line 68 for the full roll 14 is predetermined and stored in the digital image processor. FIG. 4B illustrates the roll product formation 14 in a partially depleted state, with a correspondingly decreased radial line 68. The digital image 60 is transmitted to the digital image processor 64 which differentiates the pixels corresponding to the outer circumferential edge of the roll product formation 14 within the image 60. By measuring the distance from a fixed point in the image 60 (e.g. the point adjacent to the core 30), a reduced radial line 68 is determined corresponding to a reduction in the radius or diameter of the roll 14. A value can be assigned to this reduced radial line 68, wherein this value is compared to the value of the full product 14 depicted in FIG. 4A to calculate the amount of product used or remaining based on the difference in the radius values. As with the embodiment of FIGS. 3A and 3B, these calculations may be predetermined and stored in memory within the processor 64 wherein the calculation simply includes finding the nearest stored value, or interpolating between two of the saved values. Alternatively, an exact calculation can be conducted at the time the image 60 is generated and analyzed.

Figure 5A:
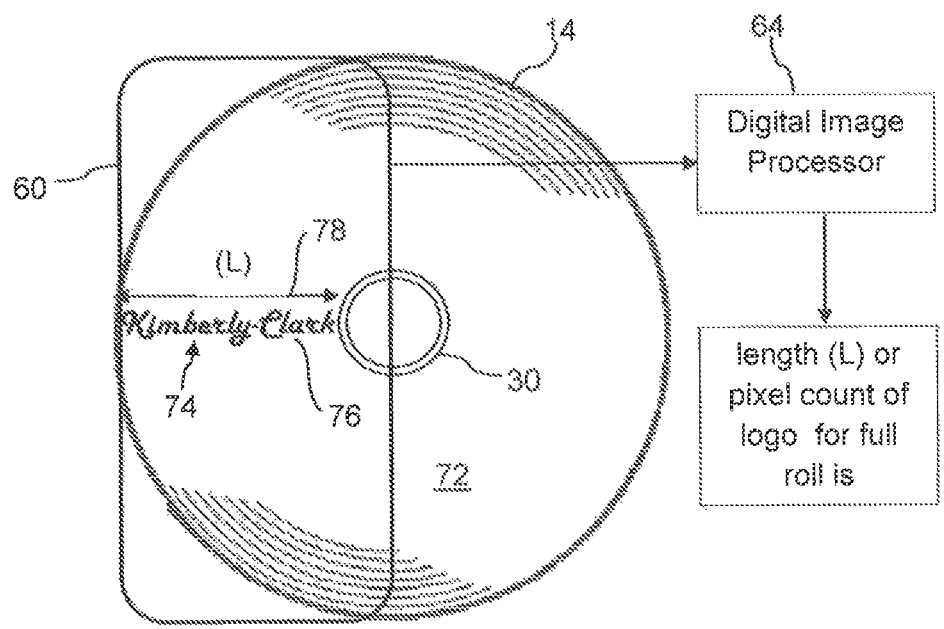
FIGS. 5a and 5b are side views of a roll product indicating a digital image taken of a full roll and a partially depleted roll, wherein the analyzed feature is a length or pixel count of a logo on the surface area of the roll in the digital image.
Figure 5B:
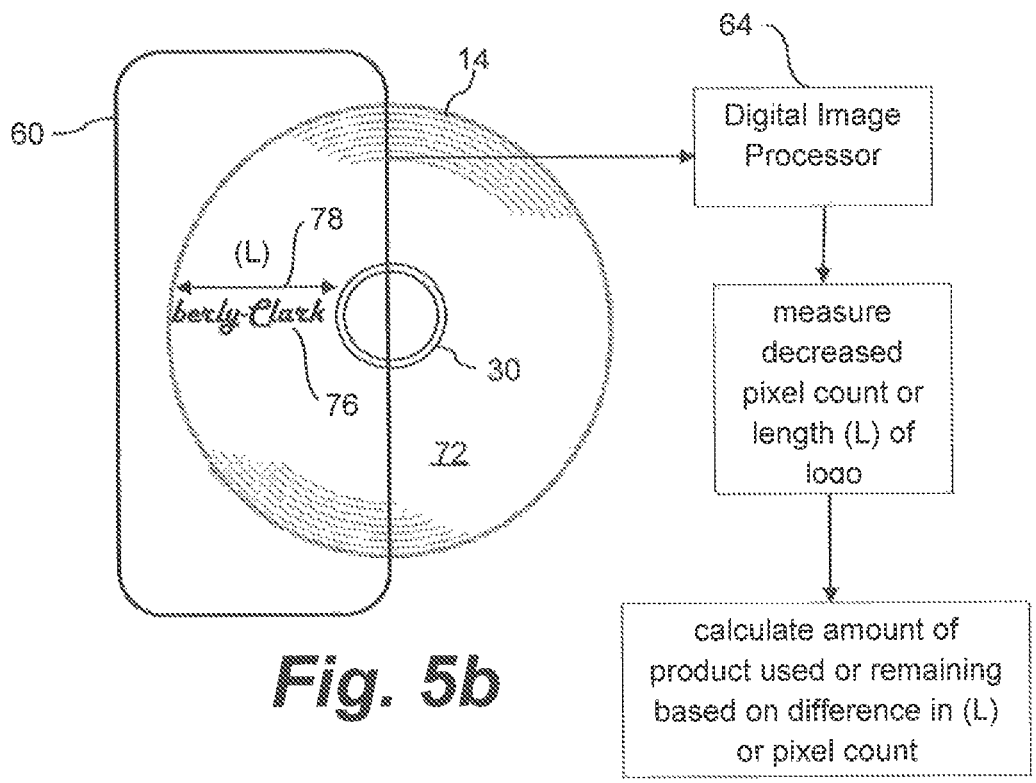

FIGS. 5A and 5B depict an embodiment wherein the digital image 60 has a larger image field that essentially encompasses half of the full roll product formation 14. It should be appreciated that multiple digital imagers 62 may be configured within the dispenser 16 to generate this larger digital image 60. In this embodiment, the analyzed feature that changes in size as the paper product formation 14 decreases in size is a mark 74 that is applied to the side 72 of the formation 14. This mark 74 may be any type of pattern, size, and so forth, that presents a contrasting color dimension along at least the radius of the roll product formation 14 (and may extend across the entire diameter of the roll 14). In the embodiment depicted in FIGS. 5A and 5B, the mark is a logo 76 that also serves to indicate origin of the roll 14, such as the manufacturer or supplier of the roll 14. The analyzed feature may be the pixel count corresponding to the logo or simply the length of the logo. For example, referring to FIG. 5A, the length L from a fixed point in the image 60 to the outer circumferential edge of the roll product formation 14 is predetermined. As the roll product formation 14 decreases in size as depicted in FIG. 5B, this length dimension L correspondingly decreases. By determining the change in length of the logo, a calculation can be readily made to determine the amount of product used or remaining on the roll product formation 14 based on the length difference as compared to the full roll product formation 14 depicted in FIG. 5A. This calculation would be similar to the radius calculation discussed above with respect to FIGS. 4A and 4B.

Alternatively and still referring to FIGS. 5A and 5B, the logo 76 is printed onto the side 72 of the roll product formation 14 with a distinctly different color, and thus pixel differentiation between the logo 76 and paper product is readily made. Referring to FIG. 5A, a total count of the pixels corresponding to the logo 76 is made and stored. In FIG. 5B, a portion of the logo 76 is removed as the roll product formation 14 decreases in size, and the count of pixels corresponding to the logo 76 will also decrease. By comparing the decreased pixel count to the full pixel count for the logo 76, a calculation may be readily made to determine the amount of product used or remaining on the roll product formation 14.

As discussed above, FIGS. 6A and 6B depict a dispensing system 10 that is configured for dispensing a stacked paper product formation 80, such as a stack of interleaved and folded paper towels 82. FIG. 6B depicts the side aspect of the dispenser system 10 wherein the side 72 of the stacked product formation 80 is visible, as well as the field of the digital image 60. In FIG. 6A, it can be appreciated that multiple digital imagers 62 may be aligned along the side 22 of the dispenser 16, wherein the respective images of the individual imagers 62 are combined to generate the digital image 60 depicted in FIGS. 7A and 7B.

Figure 7A:
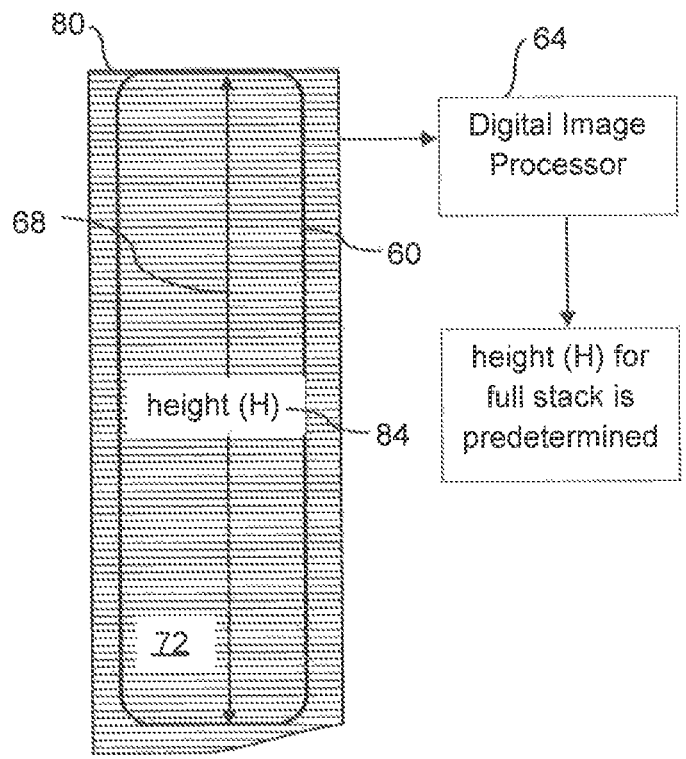
FIGS. 7a and 7b are side views of a stacked product indicating a digital image taken of a full stack and a partially depleted stack, wherein the analyzed feature is a height of the stack in the digital image.
Figure 7B:
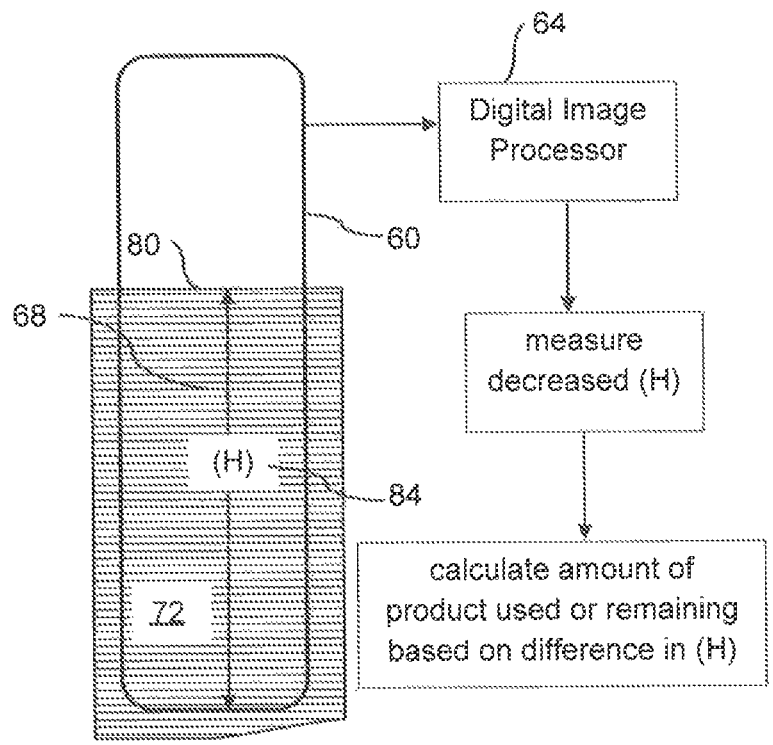

Referring to FIGS. 7A and 7B, the analyzed feature that changes as the stacked product formation 80 is depleted is a dimension of the side aspect 72 captured in the image 60. In this particular embodiment, the captured dimension is the height 84 of the stack 80. This height 84 is predetermined and known for a full stack, as depicted in FIG. 7A. FIG. 7B depicts a partially depleted condition of the stack 80 captured within the field of the digital image 60. The digital image processor 64 differentiates the pixels corresponding to the top edge of the depleted stack 80 and makes a determination of the height value 84 from a fixed point in the image to this top edge. By comparing this reduced height value to the known value for a full stack or other known depletion state of the stack, a calculation can be readily made as to the amount of product used or remaining based on the difference in height values. As with the other embodiments, these calculations may be predetermined and stored in the digital processor wherein the closest stored value is retrieved or an interpolation is made between two of the saved values, or an exact calculation is conducted at the time of capturing the digital image 60.

Figure 8A:
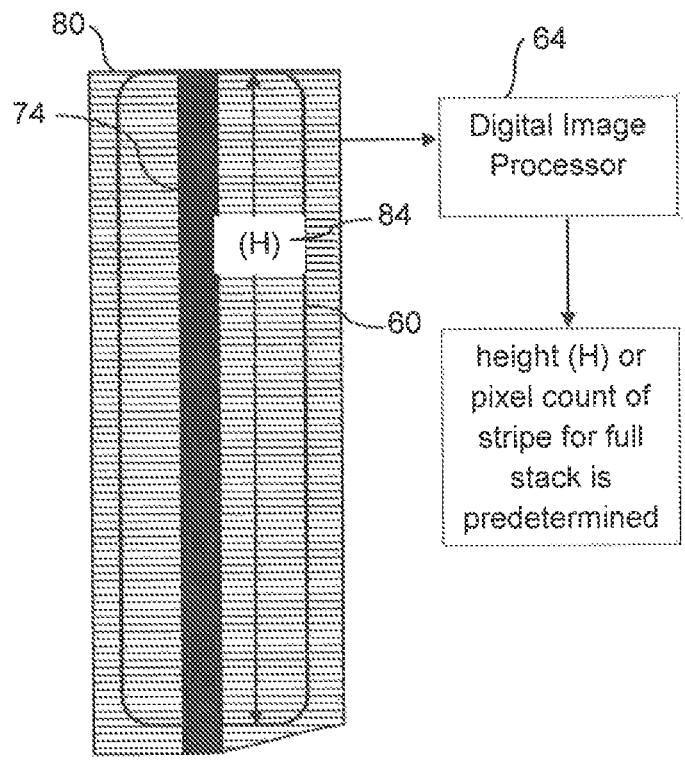
FIGS. 8a and 8b are side views of a stacked product indicating a digital image taken of a full stack and a partially depleted stack, wherein the analyzed feature is a height or pixel count of a mark applied to the stack in the digital image.
Figure 8B:
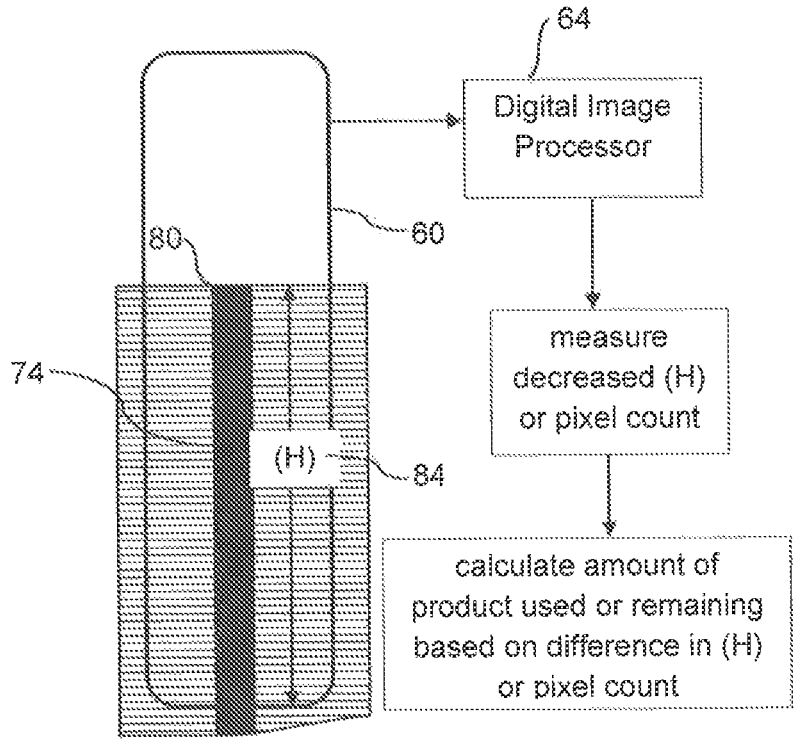

FIGS. 8A and 8B depict an embodiment wherein a mark 74, such as a dark stripe, is applied to the side aspect 72 of the stacked product formation 80. As the product is depleted, the mark captured in the digital image 60 also reduces in size. As with the embodiment in FIGS. 5A and 5B, the analyzed feature may simply be the height 84 of the mark captured in the image 60 from a fixed point (e.g. the bottom of the image 60) or the analyzed feature may be the pixel count of the mark. As with the embodiment of FIGS. 5A and 5B, the total pixel count of the mark 74 is known for a full condition of the stacked product formation 80. By comparing a reduced pixel count obtained in the digital image 60 of FIG. 8B to this known value, the amount of product used or remaining in the formation 80 can be readily determined.

Figure 9A:
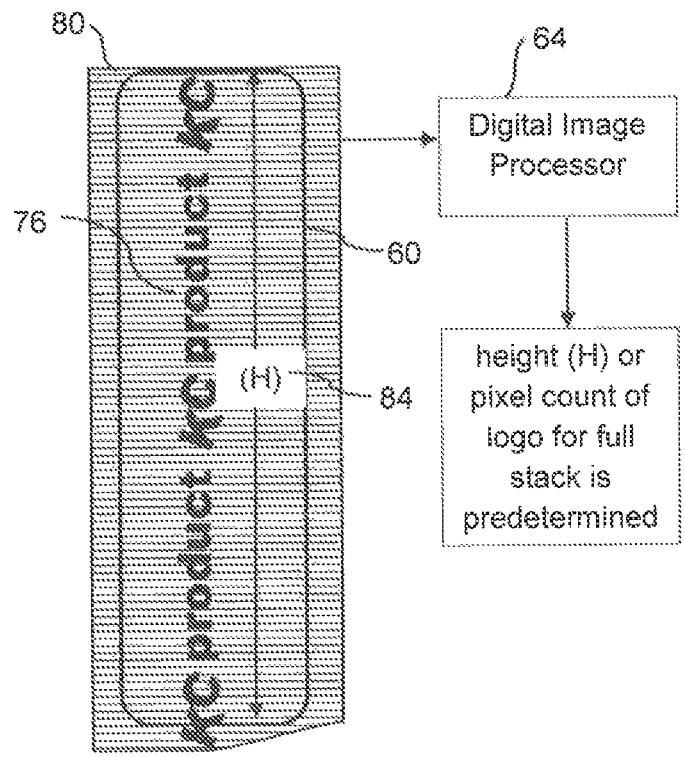
FIGS. 9a and 9b are side views of a stacked product indicating a digital image taken of a full stack and a partially depleted stack, wherein the analyzed feature is a height or pixel count of a logo applied to the stack in the digital image.
Figure 9B:
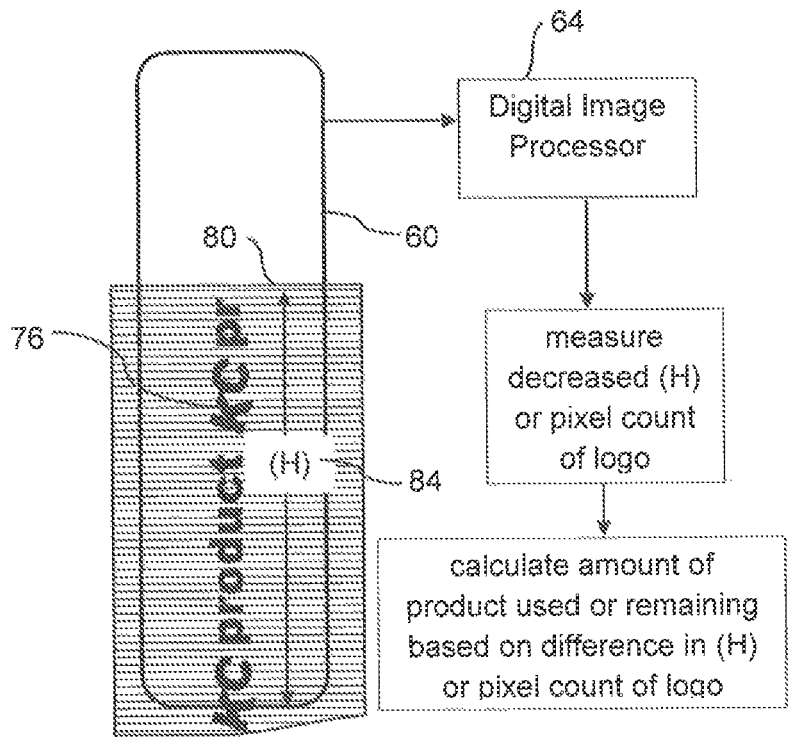

In FIGS. 9A and 9B, the mark applied to the side aspect 72 of the stacked product formation 80 is a logo 76 that identifies the manufacturer or supplier of the product 80. As with the embodiment of FIGS. 8A and 8B, the analyzed feature that changes with depletion of the paper product is either the height 84 of the logo or the pixel count corresponding to the logo.

Figure 10:
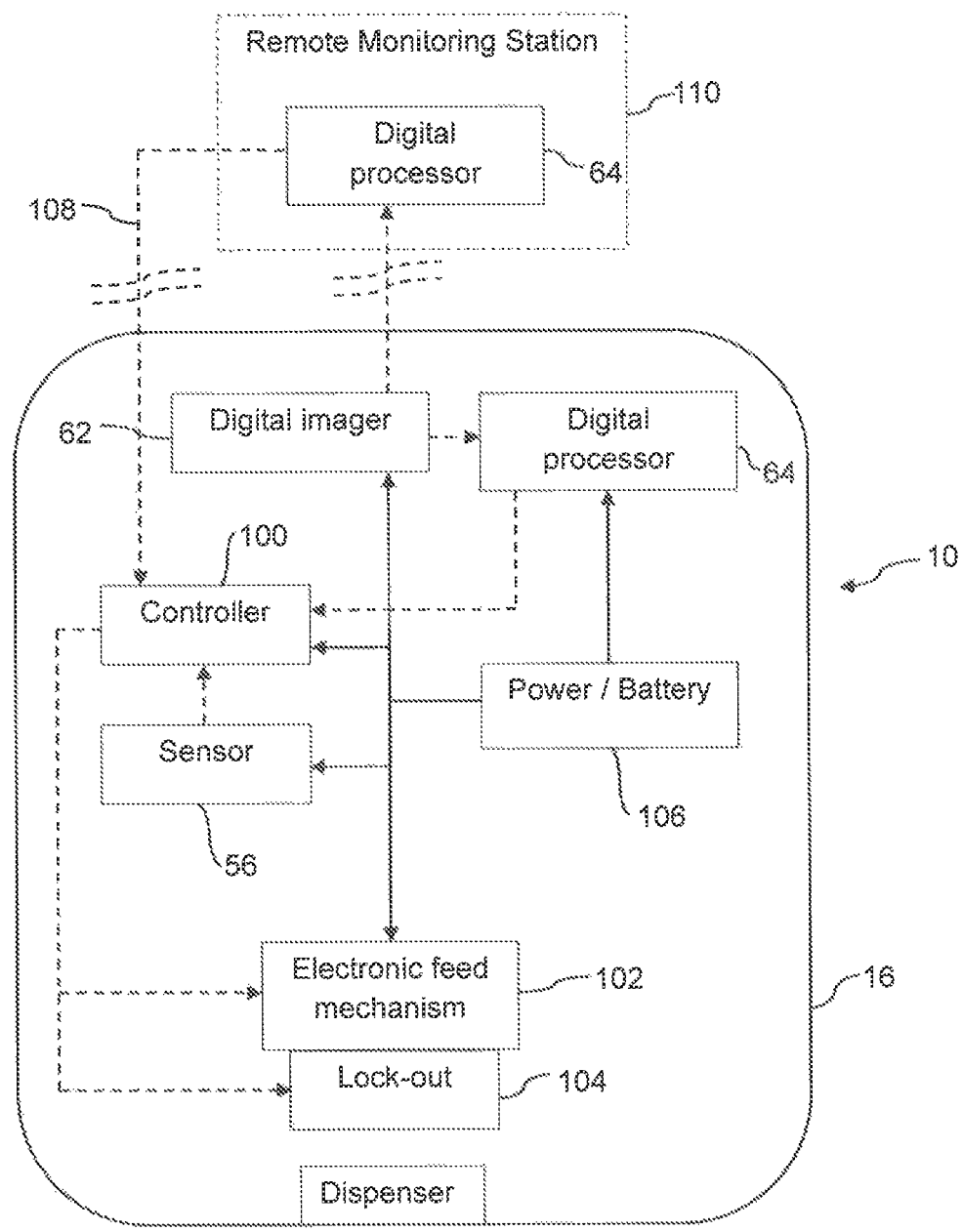
FIG. 10 is a diagram view of control functions and components of a dispenser incorporating features of the present invention.

FIG. 10 is a diagram illustrating various component functionalities of the systems and method. In the illustrated embodiment, the system 10 includes the dispenser 16 having the digital processor 64 and imager 62 incorporated with the individual dispenser 16. Power is supplied externally or internally via a battery 106 to the various components, including the digital processor 64, digital imager 62, dispenser controller 100, sensor 56, and an electronic feed mechanism 102. As discussed above, aspects of the present method and system may be incorporated with any manner of conventional dispenser utilizing conventional electronic feed mechanisms 102. A lock-out feature 104 is incorporated within the feed mechanism 102 and prevents dispensing of paper product from the dispenser until certain conditions are satisfied. In this particular embodiment, the required condition is recognition of a mark 76, such as the logos 76 depicted in FIGS. 5A and 9A. These logos (or other proprietary-type of marks) may be the same marks that are also used as the analyzed feature, as discussed above, or may be marks that are separately applied to the paper product formations 14, 80 for the sole purpose of ensuring that only authorized products are used in the dispenser system 10. Upon initial loading of the paper product formation 14, 80 into the dispenser 16, the digital imager 62 and processor 64 may take an initial digital image 60 of the monitored aspect of the product 14, 80 wherein a pattern recognition algorithm is utilized to ensure that the logo 76 or other proprietary-type of mark is present on the product. If the mark 76 is not detected, then it can be assumed that the product 14, 80 is not authorized and a signal is sent by the digital imager 64 to the dispenser controller 100. The controller 100 in turn initiates the lock-out feature 104. This aspect of the present system and method is advantageous in that it ensures that only quality products are dispensed, and that inferior products that may cause jamming of the dispenser are prevented.

While the present invention has been described in connection with certain preferred embodiments it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method for determining an amount of paper product dispensed from a dispenser or remaining in the dispenser, wherein the paper product is initially loaded in the dispenser as a paper product formation, the method comprising:
    at defined intervals, taking a digital image of an aspect of the paper product formation in the dispenser, and transmitting the digital image to a digital imager processor;
    with the digital image processor, analyzing a feature of the digital image that changes as the paper product formation decreases in size as the paper product is dispensed;
    comparing the analyzed feature with a predetermined value of the feature at a predefined size of the paper product formation to determine an amount of the paper product dispensed or remaining in the dispenser;
    wherein the analyzed feature is a dimension or count of pixels in the digital image of the feature that changes as the paper product formation decreases in size, wherein a decreasing pixel count or dimension is a measure of the amount of product dispensed;
    wherein the digital image is taken of a side of the paper product formation to determine the dimension or pixel count of the analyzed feature; and
    further comprising forming a mark on the side of the paper product formation, the mark having a color that contrasts with the paper product and a pattern or design that decreases in size as the paper product is dispensed, wherein the mark is analyzed for the dimension or pixel count and the digital image processor compares the dimension or pixel count of the mark with a known dimension or total count of the pixels corresponding to the mark at a predefined size of the paper product formation.

2. The method as in claim 1, wherein the mark has a darker color than the paper product formation sufficient to produce readily definable darker pixels that are readily detected by the digital image processor as compared to lighter pixels corresponding to the paper product.

3. The method as in claim 1, wherein the paper product formation is a stack of folded paper products, the mark extending from a lower bottom portion of the stack towards an upper edge of the stack.

4. The method as in claim 1, wherein the paper product formation is a roll of continuous paper product, the mark extending radially from a center portion of the side towards a circumferential edge of the roll.

5. The method as in claim 1, wherein the mark is a design or image that indicates origin of the paper product formation, and further comprising analyzing the digital image with the digital image processor to determine if the mark is present and valid before allowing dispensing of the paper product from the dispenser.

6. The method as in claim 5, wherein the dispenser includes a lock-out feature that prevents dispensing of the paper product unless an authorized paper product formation is loaded in the dispenser, the digital image processor interfaced with the lock-out feature and determining whether the paper product formation is authentic based on presence of a valid detected mark.

7. A method for determining an amount of paper product dispensed from a dispenser or remaining in the dispenser, wherein the paper product is initially loaded in the dispenser as a paper product formation, the method comprising:
    at defined intervals, taking a digital image of an aspect of the paper product formation in the dispenser, and transmitting the digital image to a digital imager processor;
    with the digital image processor, analyzing a feature of the digital image that changes as the paper product formation decreases in size as the paper product is dispensed; and
    comparing the analyzed feature with a predetermined value of the feature at a predefined size of the paper product formation to determine an amount of the paper product dispensed or remaining in the dispenser;
    wherein the analyzed feature is a dimension or count of pixels in the digital image of the feature that changes as the paper product formation decreases in size, wherein a decreasing pixel count or dimension is a measure of the amount of product dispensed;
    wherein the digital image is taken of a side of the paper product formation to determine the dimension or pixel count of the analyzed feature; and
    wherein the feature that changes as the paper product formation decreases in size is surface area of the side of the paper product formation, wherein a color of the paper product formation sufficiently contrasts with a background color in the digital image to produce definable pixels that are detectable by the digital image processor for determining a pixel count or dimension corresponding to surface area of all or a portion of the side of the paper product depicted in the digital image.

8. A method for determining an amount of paper product dispensed from a dispenser or remaining in the dispenser, wherein the paper product is initially loaded in the dispenser as a paper product formation, the method comprising:
    at defined intervals, taking a digital image of an aspect of the paper product formation in the dispenser, and transmitting the digital image to a digital imager processor;
    with the digital image processor, analyzing a feature of the digital image that changes as the paper product formation decreases in size as the paper product is dispensed; and
    comparing the analyzed feature with a predetermined value of the feature at a predefined size of the paper product formation to determine an amount of the paper product dispensed or remaining in the dispenser;
    wherein the analyzed feature is a dimension or count of pixels in the digital image of the feature that changes as the paper product formation decreases in size, wherein a decreasing pixel count or dimension is a measure of the amount of product dispensed;
    wherein the digital image is taken of a side of the paper product formation to determine the dimension or pixel count of the analyzed feature; and
    wherein the feature that changes as the paper product formation decreases in size is a dimension of the side of the paper product formation, the digital image processor determining a value for the dimension from the digital image and comparing the determined value to a known value of the dimension at predefined size of the paper product formation to determine an amount of the paper product dispensed or remaining in the dispenser.

9. The method as in claim 8, wherein the paper product formation is a stack of folded paper products, the dimension corresponding to a height of the stack as the stack is dispensed.

10. The method as in claim 8, wherein the paper product formation is a roll of continuous paper product, the dimension corresponding to a radius, circumference, or diameter of the roll as the roll is dispensed.

\* \* \* \* \*